June 13, 1944.   F. E. HAHNE   2,351,202
MANUFACTURING THIN RUBBER ARTICLES
Filed March 4, 1942   2 Sheets-Sheet 1
*Fig.1*
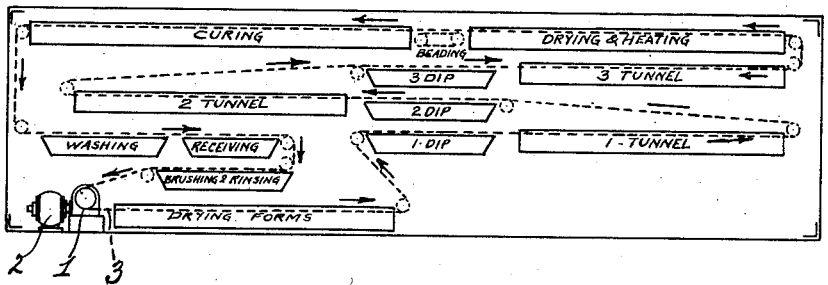
*Fig.2*
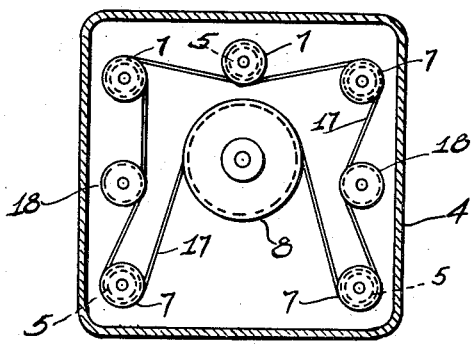
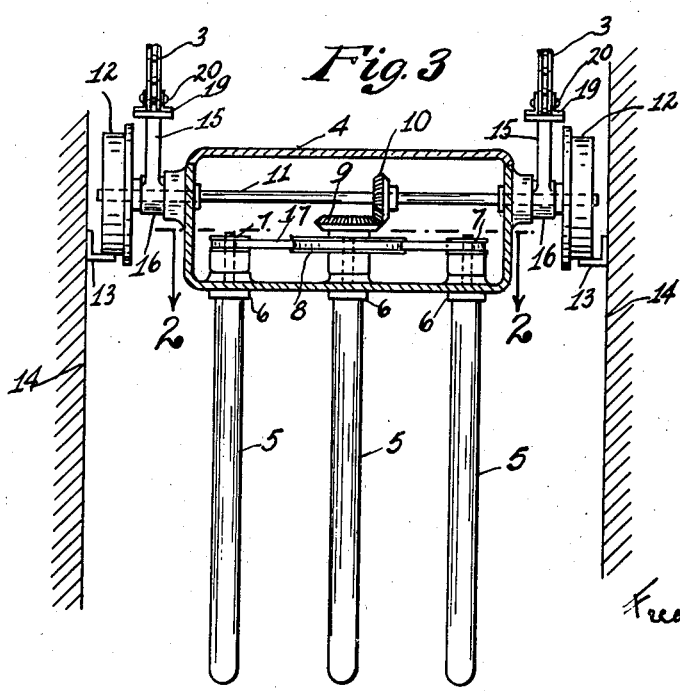
*Fig.3*
INVENTOR.
Frederick E. Hahne June 13, 1944. F. E. HAHNE 2,351,202
MANUFACTURING THIN RUBBER ARTICLES
Filed March 4, 1942 2 Sheets-Sheet 2

INVENTOR.
Frederick E. Hahne

Patented June 13, 1944

2,351,202

UNITED STATES PATENT OFFICE 2,351,202

MANUFACTURING THIN RUBBER ARTICLES

Frederick E. Hahne, New York, N. Y., assignor to Chemical Enterprises, Inc., New York, N. Y.

Application March 4, 1942, Serial No. 433,317

5 Claims. (Cl. 18—24)

This invention relates to the manufacturing of articles by what is commonly known as the dipping process and may be adapted to various articles composed of any suitable material of a congealable liquid type or capable of being reduced to a solution or dispersion and deposited on a form.

More particularly it relates to apparatus for automatically manufacturing articles by dipping forms into liquids and while intended for use generally with various solutions and dispersions to any art to which it may be advantageously applied, it specifically relates to apparatus for producing thin dipped rubber articles from liquid latex or rubber cement.

The invention is particularly adapted for use in the manufacture of thin rubber articles such as rubber balloons, finger-cots, prophylactics, nipples, rubber gloves and bathing caps. In such manufacturing, a rubber solution is first provided as in the form of latex partly reduced by a coagulation process to the desired consistency or in the form of a cement consisting of rubber dissolved in naphtha or other solvent.

In carrying out the automatic manufacturing of thin rubber articles an endless conveyor moves a plurality of dipping forms on which the articles are to be passed through and along various treatment devices and vats filled with treatment liquids. As soon as any individual form has completed a treatment cycle, an article is finished on such a form and can be removed from the form.

One object of my invention is to provide means for guiding holders carrying dipping forms through and along various treatment devices and vats filled with treatment liquids and to arrange the various treatment devices and vats in such a manner that the manufacturing process can be carried out within a comparatively limited space and that the individual forms progress smoothly from station to station.

Another object of my invention is to form groups of form holders and to provide a single carrier for each group of forms. This has the advantage that the number of gear wheels, bearings and so like required for controlling the movements of the dipping forms while passing through the various treatment stations is greatly reduced, since for each group carrier only one set of gear wheels, bearings and so like is required.

Another object of my invention is to provide means for rotating all forms united into a group by means of a master driving wheel. I thereby accomplish a rotation of all forms by very simple and inexpensive means.

Another object of my invention is to provide means by which the forms can be dipped very rapidly into a liquid filled vat and equally rapidly withdrawn from the vat after the termination of the dipping process. This is advantageous for the formation of a uniform layer of rubber on the forms.

Other and further objects of my invention will be hereinafter set forth and the novel features thereof defined by the appended claims.

In the accompanying drawings several embodiments of my invention are shown.

Fig. 1 shows more or less diagrammatically a machine for manufacturing thin rubber goods.

Fig. 2 is a cross-section of a carrier carrying a unit of dipping forms and of means for rotating the dipping forms supported by the carrier.

Fig. 3 is a section of a group carrier as shown in Fig. 2 along line 2—2.

Figure 4:
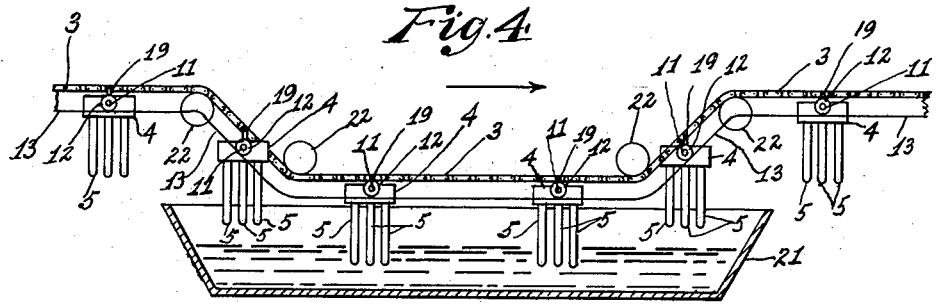
Fig. 4 shows a diagrammatic side view of an individual vat and of guiding means for moving dipping forms united into groups through the vat.

Fig. 1 shows diagrammatically a machine for automatically manufacturing thin dipped rubber goods from rubber in solution or dispersion form such as latex. As this figure indicates the machine includes a sprocket wheel I driven by a motor 2. An endless conveyor 3 is moved about sprocket wheel I. This conveyor carries a plurality of dipping forms spaced along the conveyor and serves to move these dipping forms successively past driving stations where various operations are performed on the dipping forms or on rubber films deposited thereon. The dipping forms are divided in units or groups. Each unit or group is carried by a group carrier. Starting for example with the moment when the forms have left the station designated "drying of forms" the forms are carried for the first dip. through the first vat where a film of rubber is deposited on the forms, whereupon the forms pass through the first tunnel where cold and hot air is brought into contact with the rubber films on the forms. Then the forms are dipped into the second dip tank or vat to deposit a second layer of rubber on the first layer. These layers are subjected to treatment with cold and hot air as before in the second tunnel. Then the forms are dipped into the third dip vat to deposit the third layer of rubber on the second layer and the layers are again subjected to a treatment with cold and hot air. From the third tunnel, the forms may be passed through an additional "drying and heating station." Then the forms reach the "beading station" here beads are formed on the open end of the films by any conventional beading means. Thereupon, the forms are passed through a curing tunnel where the rubber layers are vulcanized due to the presence of vulcanizers in the rubber layers or due to the presence of steam. Then the films formed on the forms are washed and tested if required. Finally the forms reach the "receiving station" where the completed articles are removed from the forms. Then the forms themselves pass through a "brushing and rinsing station" and a "drying station." This completes the cycle and the forms are again ready for use.

The dipping forms carried by a conveyor 3 are divided into groups or units. Each group or unit is carried by a group carrier. Figs. 2 and 3 show the details of such group carrier. A group carrier comprises a square or rectangular casing 4 made of any suitable material. Each group carrier carries several dipping forms 5, for example five. These dipping forms may be of conventional design and consist of an elongated body made of glass, metal or any other suitable material. They are rotatably secured to the bottom of casing 4. Each dipping form is passed with its upper end through the bottom of casing 4 in which it is secured by any suitable means. Bearings 6 may be provided to secure an easy rotation of the dipped forms. At the upper end of each dipping form pulleys 7 are provided. In the center of the casing or in any other suitable position a master wheel 8 is arranged which is rotatably secured to casing 4. Rigidly attached to this master wheel is a bevel wheel 9 which engages another bevel wheel 10. This second bevel wheel is secured to an axle 11 the ends of which are passed through the side walls of casing 4 and carry two driving wheels 12. These driving wheels are arranged to engage stationary friction rails 13 which may be attached to the housing 14 of the apparatus or supported by any suitable standard. The group carriers themselves are suspended from and moved by a conveyor 3 which may be a chain conveyor. They are secured to the conveyor chain by means of carrier arms 15. These carrier arms end in bearings 16 through which axles 11 are passed. Consequently, each group carrier with its dipping forms 5 is swingably suspended from the conveyor chain and can freely swing around axle 11. As soon as driving wheels 12 engage friction rails 13 while a group carrier is moved by the conveyor chain, driving wheels 12 will rotate master wheel 8. Master wheel 8 is operatively coupled with pulleys 7 by means of a driving belt or chain 17. Tension pulleys 18 may be provided in order to adjust the tension of driving belt 17.

As it is apparent from the previous specification all dipping forms are rotated by means of a master wheel while driving wheels 12 are engaging friction rails 13. These friction rails are provided wherever a rotation of the dipping forms is desired to secure uniform deposits on the dipping forms. I have found that rotation is particularly useful and desirable while the dipping forms pass through the dipping vats and immediately thereafter in order to avoid the forming of rubber lumps.

Connection between carrier arms 15 and the links of the conveyor chain 3 can be made by any suitable means, for instance by angle irons 19 and rivets 20.

Fig. 4 illustrates the guiding of form units through one of the dipping vats, for example a vat 21. It is essential for the formation of a uniform deposit of rubber on a form that the forms are dipped as fast as practical into the rubber solution and withdrawn from the vat as rapidly as it is practical. Such rapid dipping and withdrawing has the effect that the entire length of the form to be dipped remains for approximately the same time submerged in the solution. I have found that a rapid dipping and withdrawing improves the quality of the obtained deposit.

In order to accomplish a rapid dipping and withdrawal of dipping forms, I provide guiding means by which the conveyor chain which normally carries the form carriers above the level of the dipping forms is guided steeply downward when approaching a vat then horizontally while the dipping forms travel through the treatment liquid and then steeply upwards again. In the embodiment shown in Fig. 4 these guiding means comprise guiding wheels 22. However, other suitable guiding means can be used. The conveyor may move the group carrier in a continuous or an intermittent motion through the treatment liquid. In the latter case the movement of the conveyor chain is arrested for a certain length of time while each dipping form is in the dipping vat.

Since the individual group carriers are pivotably arranged around their axles 11 they will always assume a horizontal position due to the weight of the dipping forms as is indicated in Fig. 4. This has the advantage that the dipping forms always remain in a vertical position which I have found preferable for the forming of a uniform deposit. While the dipping forms travel through the dipping liquid and before and after the individual dipping forms 5 are rotated since driving wheels 12 are engaged by friction rails 13 as shown in Fig. 4. Vat 21 may be equipped with a conventional agitator, heating units and thermostats for maintaining and controlling the required treatment temperature. Since such equipment may be of conventional design and does not form part of the invention, it is not described in detail.

Figure 5:
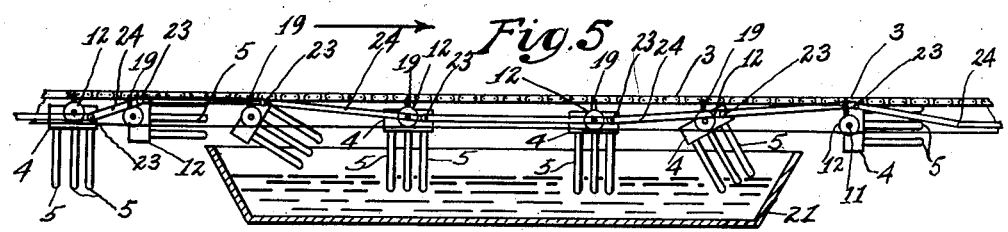
Fig. 5 shows a diagrammatic side view of a vat and of a second embodiment of guiding means for moving dipping forms united into a group through the vat.
Figure 6:
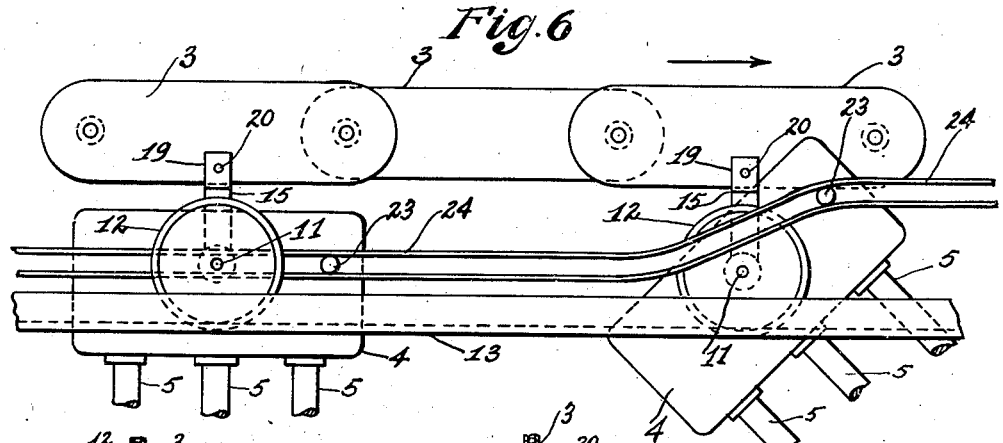
Fig. 6 shows the embodiment according to Fig. 5 on an enlarged scale in order to illustrate the guiding of individual group carriers and Fig. 7 shows an individual group carrier according to Fig. 6 and its guiding means in front view.
Figure 7:
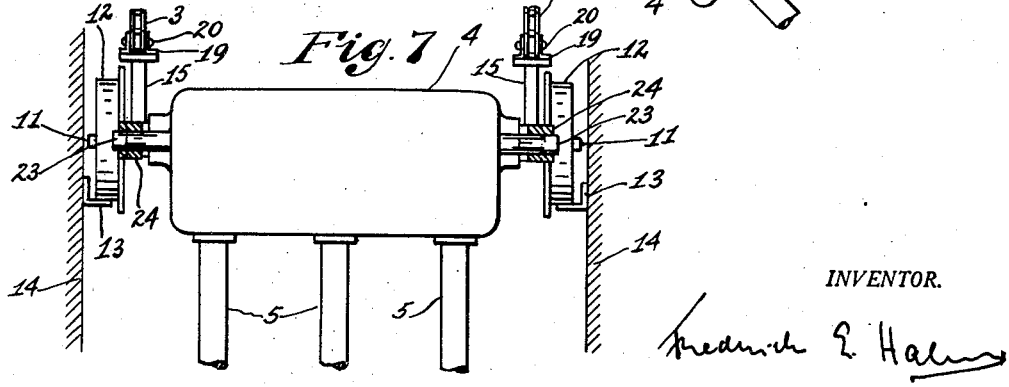

The guiding means illustrated in Fig. 5 are distinguished from those shown in Fig. 4 by using a straight horizontal conveyor chain 3. Instead of guiding the conveyor chain the movements of the group carriers themselves are controlled. This is accomplished by providing two guiding rails 24 which extend from a certain point in front of a vat to a certain point behind a vat seen in the travelling direction indicated by arrows. The guiding rails are arranged and shaped in such a manner that they force each group carrier into a tilted position before it reaches the edge of a treatment vat. In this position the individual dipping forms are lifted over the edge of the vat. As soon as an individual group carrier has cleared the edge of a vat, guiding rails 24 force the group carrier back into its horizontal position in which the individual dipping forms dip into the treatment liquid in vat 21. Dipping forms 5 remain for a certain period of time within the dipping liquid. When a group carrier approaches the other edge of the vat the guiding means swing it again into a position in which the dipping forms suspended from it are sufficiently lifted to clear the edge of the dipping vat. As soon as the dipping forms have passed the liquid vat the group carrier is swung back into its original position. Since the group carriers are pivotably arranged on their axles they will easily yield to the guidance by guiding rails 24. While the dipping forms are passing through the treatment liquid and any desired period before reaching a vat and after leaving it, the individual dipping forms are rotated. The rotation of the individual dipping forms can be easily controlled by the length of friction rails 13 as previously described.

The invention is not limited to the embodiments shown, but various changes and alterations may be made without departing from the scope of the invention.

What is claimed as new and desired to be secured by Letters Patent is as follows:

1. An apparatus of the class described for manufacturing thin rubber goods by the dipping process, comprising a plurality of dipping forms divided into several groups, a carrier for each group of dipping forms, each individual dipping form of a group being rotatably secured to its group carrier, a pulley operatively connected with each individual dipping form, a master wheel provided on each group carrier, a driving belt coupling said master wheel with all pulleys, at least one driving wheel provided on each group carrier and operatively connected with said master wheel, vats, treatment tunnels, a conveyor for moving said group carriers along and through said vats and tunnels, at least one stationary friction rail adapted to engage and revolve said driving wheel when said moving group carriers pass said stationary friction rail and means for introducing said dipping forms into and withdrawing them from said vats.

2. An apparatus of the class described for the manufacturing of thin rubber goods by the dipping process comprising a plurality of dipping forms divided into several groups, a carrier for each group of dipping forms, each individual form of a group being rotatably secured to its group carrier, a pulley operatively connected with each individual dipping form, a master wheel provided on each group carrier, a driving belt coupling said master wheel with all pulleys of a group carrier, at least one driving wheel provided on each group carrier and operatively connected with said master wheel, stationary means adapted to engage and rotate said driving wheels when the group carriers on which said driving wheels are provided pass said stationary means, vats, treatment tunnels, a conveyor for carrying said group carriers along and through said vats and tunnels, at least some of said vats being arranged within the path of said traveling group carriers, guiding means for guiding said group carriers out of the path of said vats and for dipping said dipping forms into said vats while passing over said vats.

3. An apparatus of the class described for the manufacturing of thin rubber goods by the dipping process comprising a plurality of dipping forms divided into several groups, a tiltably arranged carrier for each group of dipping forms, each individual form of a group being rotatably secured to its group carrier, a pulley operatively connected with each individual dipping form, a master wheel provided on each group carrier, a driving belt coupling said master wheel with all pulleys of a group carrier, at least one driving wheel provided on each group carrier and operatively connected with said master wheel, stationary means adapted to engage and rotate said driving wheels when the group carriers on which said master wheels are provided pass said stationary means, vats, treatment tunnels, a conveyor for carrying said group carriers along and through said vats and tunnels, at least some of said vats being arranged within the path of said traveling group carriers, means for swinging said group carriers out of the path of said vats and for dipping said dipping forms into said vats while passing over said vats.

4. An apparatus as described in claim 3 in which said swinging means for controlling the swinging movements of said group carriers comprise stationary guiding rails and arms provided on each group carrier, said arms being arranged to engage said guiding rails.

5. An apparatus of the class described for the manufacturing of thin rubber goods by the dipping process comprising a plurality of dipping forms divided into several groups, a closed housing as carrier for each group of dipping forms, each individual dipping form of a group being rotatably secured to its housing and extending from it, a pulley operatively connected with each individual dipping form and disposed within its housing, a master wheel disposed within each housing in a position surrounded by said pulleys, a driving belt coupling said master wheel with all pulleys, at least one driving wheel provided on each housing and located outside of the housing, a driving shaft provided for each housing and operatively connecting said driving wheel with said master wheel, vats, treatment tunnels, a conveyor for carrying said group carriers along and through said vats and tunnels, at least some of said vats being arranged within the path of said traveling group carriers and means for guiding said group carriers out of the path of said vats and for dipping said dipping forms into said vats while passing over said vats.

FREDERICK E. HAHNE.